US007338364B2

(12) United States Patent
Baerlocher et al.

(10) Patent No.: US 7,338,364 B2
(45) **Date of Patent: *Mar. 4, 2008**

(54) GAMING DEVICE HAVING AN ORDERED DESIGNATION OF BONUS VALUES IN MULTIPLE VALUE SETS

(75) Inventors: Anthony J. Baerlocher, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 717 days.

This patent is subject to a terminal disclaimer.

(21) Appl. No.: 10/767,378

(22) Filed: Jan. 27, 2004

(65) Prior Publication Data

US 2004/0185927 A1 Sep. 23, 2004

Related U.S. Application Data

(63) Continuation of application No. 09/978,913, filed on Oct. 15, 2001, now Pat. No. 6,688,975.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/13; 463/16; 463/17; 463/18; 463/19

(58) Field of Classification Search ............ 463/16–22, 463/25, 26, 27, 28, 40, 41, 42; 273/143 R
See application file for complete search history.

(56) References Cited

U.S. PATENT DOCUMENTS 4,582,324 A 4/1986 Koza et al.
4,695,053 A 9/1987 Vazquez, Jr. et al.
5,157,602 A * 10/1992 Fields et al. .................. 463/22
5,205,555 A 4/1993 Hamano
5,513,846 A * 5/1996 Niederlein et al. ..... 273/143 R
5,536,016 A 7/1996 Thompson
5,707,286 A 1/1998 Carlson
5,788,573 A 8/1998 Baerlocher et al.
5,823,874 A 10/1998 Adams
5,947,592 A 9/1999 Barlow
5,954,336 A * 9/1999 Goossens et al. ........... 273/309
6,015,346 A 1/2000 Bennett (Continued)

OTHER PUBLICATIONS

Jackpot Party Brochures and Articles written by WMS Gaming, Inc., published in 1998, 2000 and 2001.

(Continued)

*Primary Examiner*—Ronald Laneau
*Assistant Examiner*—Reginald Renwick
(74) *Attorney, Agent, or Firm*—Bell, Boyd & Lloyd LLP

(57) ABSTRACT

A gaming device with a bonus scheme which includes a plurality of value sets and a plurality of inputs which a player can make. After a player makes particular inputs, the gaming device stores in memory or designates certain values in certain value sets which are associated with the input outcomes. After a terminating condition occurs, the gaming device awards the player with certain stored or designated values. This type of bonus scheme adds excitement to bonus rounds and increases player entertainment.

85 Claims, 16 Drawing Sheets

U.S. PATENT DOCUMENTS

| | | | | |
|---|---|---|---|---|
| 6,059,289 | A | 5/2000 | Vancura | |
| 6,089,976 | A | 7/2000 | Schneider et al. | |
| 6,093,102 | A | 7/2000 | Bennett | |
| 6,102,798 | A | 8/2000 | Bennett | |
| 6,120,031 | A | 9/2000 | Adams | |
| 6,120,377 | A * | 9/2000 | McGinnis et al. | 463/20 |
| 6,123,333 | A * | 9/2000 | McGinnis et al. | 273/146 |
| 6,126,542 | A | 10/2000 | Fier | |
| 6,146,273 | A | 11/2000 | Olsen | |
| 6,159,097 | A | 12/2000 | Gura | |
| 6,159,098 | A | 12/2000 | Slomiany et al. | |
| 6,168,523 | B1 | 1/2001 | Piechowiak et al. | |
| 6,174,233 | B1 | 1/2001 | Sunaga et al. | |
| 6,174,235 | B1 | 1/2001 | Walker et al. | |
| 6,190,255 | B1 | 2/2001 | Thomas et al. | |
| 6,203,429 | B1 | 3/2001 | Demar et al. | |
| 6,231,442 | B1 | 5/2001 | Mayeroff | |
| 6,231,445 | B1 | 5/2001 | Acres | |
| 6,261,177 | B1 | 7/2001 | Bennett | |
| 6,270,412 | B1 | 8/2001 | Crawford et al. | |
| 6,309,300 | B1 | 10/2001 | Glavich | |
| 6,315,664 | B1 | 11/2001 | Baerlocher et al. | |
| 6,319,123 | B1 | 11/2001 | Paludi | |
| 6,319,124 | B1 | 11/2001 | Baerlocher et al. | |
| 6,328,649 | B1 | 12/2001 | Randall et al. | |
| 6,336,860 | B1 | 1/2002 | Webb | |
| 6,346,043 | B1 | 2/2002 | Colin et al. | |
| 6,347,996 | B1 | 2/2002 | Gilmore et al. | |
| 6,645,074 | B2 * | 11/2003 | Thomas et al. | 463/20 |
| 6,875,108 | B1 * | 4/2005 | Hughs-Baird | 463/26 |
| 2002/0052232 | A1 * | 5/2002 | Kaminkow | 463/20 |
| 2004/0185930 | A1 * | 9/2004 | Thomas et al. | 463/16 |

OTHER PUBLICATIONS

Richard Petty Advertisement written by IGT, published in 2000.
Spell Binder Article written by Strictly Slots, published in 2000.
Good Times Advertisement written by IGT, published in 1999.
Psycho Cash Beast Advertisement written by IGT, published in 1999.
Slot Line Article describing Temperature Rising Game written by IGT, published in 1998.
Diamond Mine Advertisement written by IGT, published prior to 2001.
Neon Nights Brochure written by IGT, published in 2000.
Price is Right—Showcase Show Down Advertisement written by IGT, published in 2001.
Addam Family Article written by Strictly Slots, published in Jul. 2000.
Bingo Advertisement written by Casino Data Systems, published in 1998.
Five Card Instant Bingo Advertisement written by IGT, published in 2000.

* cited by examiner

GAMING DEVICE HAVING AN ORDERED DESIGNATION OF BONUS VALUES IN MULTIPLE VALUE SETS

CROSS REFERENCE TO RELATED APPLICATIONS

This application is a continuation application of U.S. patent application Ser. No. 09/978,913 now U.S. Pat. No. 6,688,975, filed on Oct. 15, 2001, entitled "Gaming Device Having an Ordered Designation of Bonus Values in Multiple Value Sets," which is incorporated herein by reference.

This application is related to the following co-pending commonly owned patent applications: "Gaming Device Having A Bonus Scheme With Multiple Selection Groups," Ser. No. 09/656,702 now U.S. Pat. No. 6,439,995, Gaming Device Having Competition Bonus Scheme," Ser. No. 09/628,144 now U.S. Pat. No. 6,406,369, "Gaming Device Having A Multiple Selection Group Bonus Round," Ser. No. 09/605,107 now U.S. Pat. No. 6,511,375, "Gaming Device Having Related Multi-Game Bonus Scheme," Ser. No. 09/688,972, "Gaming Device With A Bonus Scheme Having Repeated Selection Of Value Sets With Option To Save Values," Ser. No. 09/684,533 now U.S. Pat. No. 6,464,582, "Gaming Device Having A Multiple Selection And Award Distribution Bonus Scheme," Ser. No. 09/688,635 now U.S. Pat. No. 6,599,185, "Gaming Device Having Regenerating Multiple Award Opportunities," Ser. No. 09/960,784 now U.S. Pat. No. 7,066,814, "Gaming Device Including Choices Having Varying Probabilities Of Contributing To Game's Termination," Ser. No. 09/957,308 now U.S. Pat. No. 6,758, 747, "Gaming Device Having Termination Variable," Ser. No. 09/966,658 now U.S. Pat. No. 6,607,438, "Gaming Device Having A Bonus Scheme With Multiple Potential Award Sets," Ser. No. 09/822,697 now U.S. Pat. No. 6,796, 899, "Gaming Device Having An award Distributor And An Award Accumulator Bonus Game," Ser. No. 09/682,369 now U.S. Pat. No. 6,663,489, and "Gaming Device Having Competing Awards," Ser. No. 09/960,785 now U.S. Pat. No. 6,722,983.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which has a bonus game which enables players to make inputs and receive values in a particular value order from value sets associated with the outcomes of the inputs.

BACKGROUND OF THE INVENTION

Many existing gaming machines, such as traditional slot machines, include bonus rounds. Typically, a bonus round begins when the player reaches a bonus triggering event in the primary game of the gaming device. In slot machines with reels, the triggering event usually occurs when the player reaches a predetermined combination of symbols on the reels. Usually, the bonus scheme provides the player with an opportunity to gain a bonus value before the bonus round terminates. Some of these existing bonus schemes involve players making inputs and receiving values associated with the outcomes of the inputs. To increase player enjoyment and excitement, it is desirable to provide players with new gaming device bonus schemes.

SUMMARY OF THE INVENTION

The gaming device bonus scheme of the present invention provides players with a plurality of inputs and value sets. An input can include any opportunity to cause an outcome or initiate an event or sequence of events in a bonus round. Each of the value sets includes a plurality of predetermined values. The values are arranged in a predetermined value order. The value order is the order or sequence in which the gaming device stores in memory, and preferably indicates, different values in a value set. The gaming device can indicate or distinguish values in any fashion so as to inform a player as to which values the gaming device may award to the player at the end of the bonus round. For example, a value set may include the values twenty, ten, fifty and thirty. The value order could be first fifty, second ten, third thirty and fourth twenty. Preferably, the values increase in magnitude in a trend consistent with the value order. In this example, the value order is thus preferably first ten, second twenty, third thirty and fourth fifty. It is also preferable that each of the value sets in a bonus round include the same quantity of values.

The gaming device enables the player to gain values by making certain inputs. By making inputs, a player can cause the gaming device to temporarily store in memory or otherwise designate and preferably indicate, values in value sets associated with certain input outcomes. The gaming device terminates when a terminating condition occurs. In one embodiment, a terminating condition occurs when a player makes a predetermined input or when the gaming device stores, designates or indicates a predetermined amount of values.

In one embodiment, when the bonus round terminates, the gaming device awards the player with one or more, and preferably all of the stored, designated or indicated values. In other embodiments, when the bonus round terminates, the gaming device processor applies a predetermined mathematical equation or formula to the designated values in the value sets. Using the formula, the processor calculates a final bonus value award which the player receives. The formula can include: (a) the addition of the values designated in the value sets; (b) the subtraction of the values designated in the value sets; (c) the multiplication of the values designated in the value sets; or (d) any other mathematical operation or manipulation of the designated values in the value sets.

In operation of one embodiment, the gaming device provides the player with a predetermined number of inputs and value sets associated with certain input outcomes. The gaming device then enables a player to make an input. If the input outcome does not result in a terminating condition, the gaming device stores in memory or designates, and preferably indicates, one or more of the values in the value set associated with the input outcome. When storing, designating or indicating values, the gaming device follows the value order associated with the value sets which include such values. This process continues until the player makes an input which results in a terminating condition. When the bonus round terminates, the gaming device provides the player with a payout equal to the sum of some and preferable all of the stored, designated or indicated values in all of the value sets.

In one embodiment, the input is a choice of selections. The gaming device visually informs the player of the value order associated with each value set. In this embodiment, the value sets include vertical arrangements of values, and the gaming device indicates values in a value order from bottom to top in a ladder-like fashion. When a player chooses a selection, the gaming device reveals a symbol. Some symbols are associated with particular value sets and others limit the duration of the bonus round. Preferably, the relationship of symbol to value set is indicated to the player through graphics and/or themes shared by the value sets and the symbols. For example, a bonus round could include three value sets which are colored red, green and gold, respectively, and the respective symbols associated with those value sets could be colored red, green and gold. Therefore, if a player chooses a selection which reveals a red symbol, the gaming device would indicate the first value in the red value set. The gaming device enables the player to choose additional selections until a terminating condition occurs. In this embodiment, a terminating condition preferably occurs when the gaming device indicates all of the values in a value set or when a player chooses a selection which terminates the bonus round. When the terminating condition occurs, the gaming device provides the player with the payout corresponding to all of the indicated values in all of the value sets.

It is also preferable that, in this embodiment, the symbols do not change in position or quantity after the player chooses a selection. As such, the gaming device preferably displays or reveals each symbol reached by the player continuously until the bonus round terminates. In an alternative embodiment, after the player chooses a selection, the gaming device can change the position and/or quantity of symbols provided to the player. Preferably in such embodiment, the gaming device enables the player to choose the same selection more than once.

It should be appreciated that although it is preferable that when a player makes an input, the processor designates a single value in a value set, the input outcome can cause the processor to simultaneously designate multiple values. This type of outcome is at times referred to herein as a multi-value outcome. For example, if a value set has five values and a player makes a predetermined input, a multi-value outcome may occur, causing the processor to designate three values for the player at one time.

The bonus scheme of the present invention provides players with a plurality of value sets and one or more input opportunities to indicate values in the value sets. When indicating values in value sets, the gaming device does so in a predetermined value order by incrementing from the first value toward the last value. In one embodiment, when the player chooses certain selections during a bonus round, the gaming device indicates values in the value sets associated with the chosen selections. This type of bonus scheme increases the enjoyment and entertainment experienced by gaming device players.

It is therefore an advantage of the present invention to provide a gaming device having an ordered designation of bonus values in multiple value sets.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
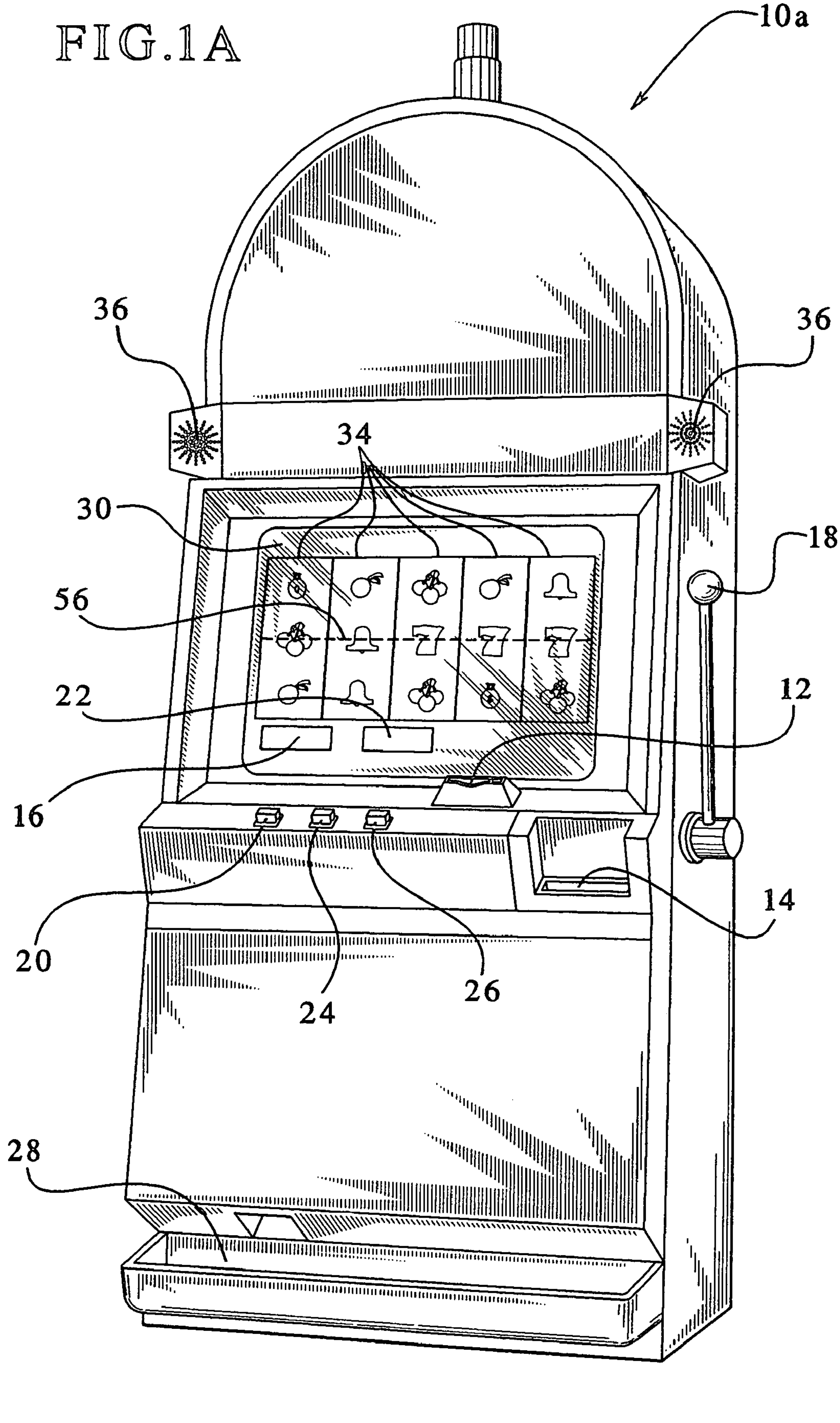
FIG. 1A is a perspective view of one embodiment of the gaming device of the present invention.
Figure 1B:
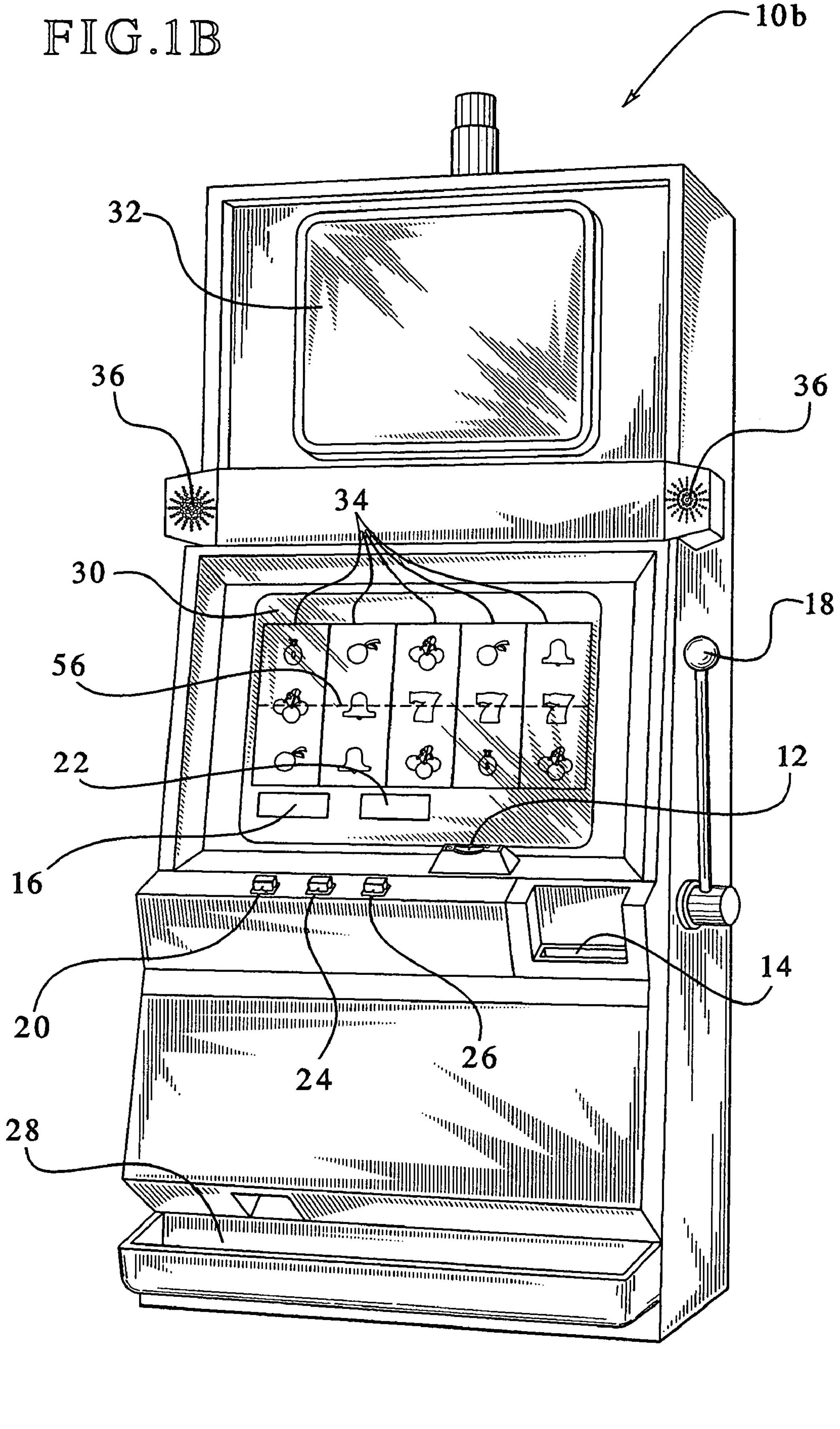
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
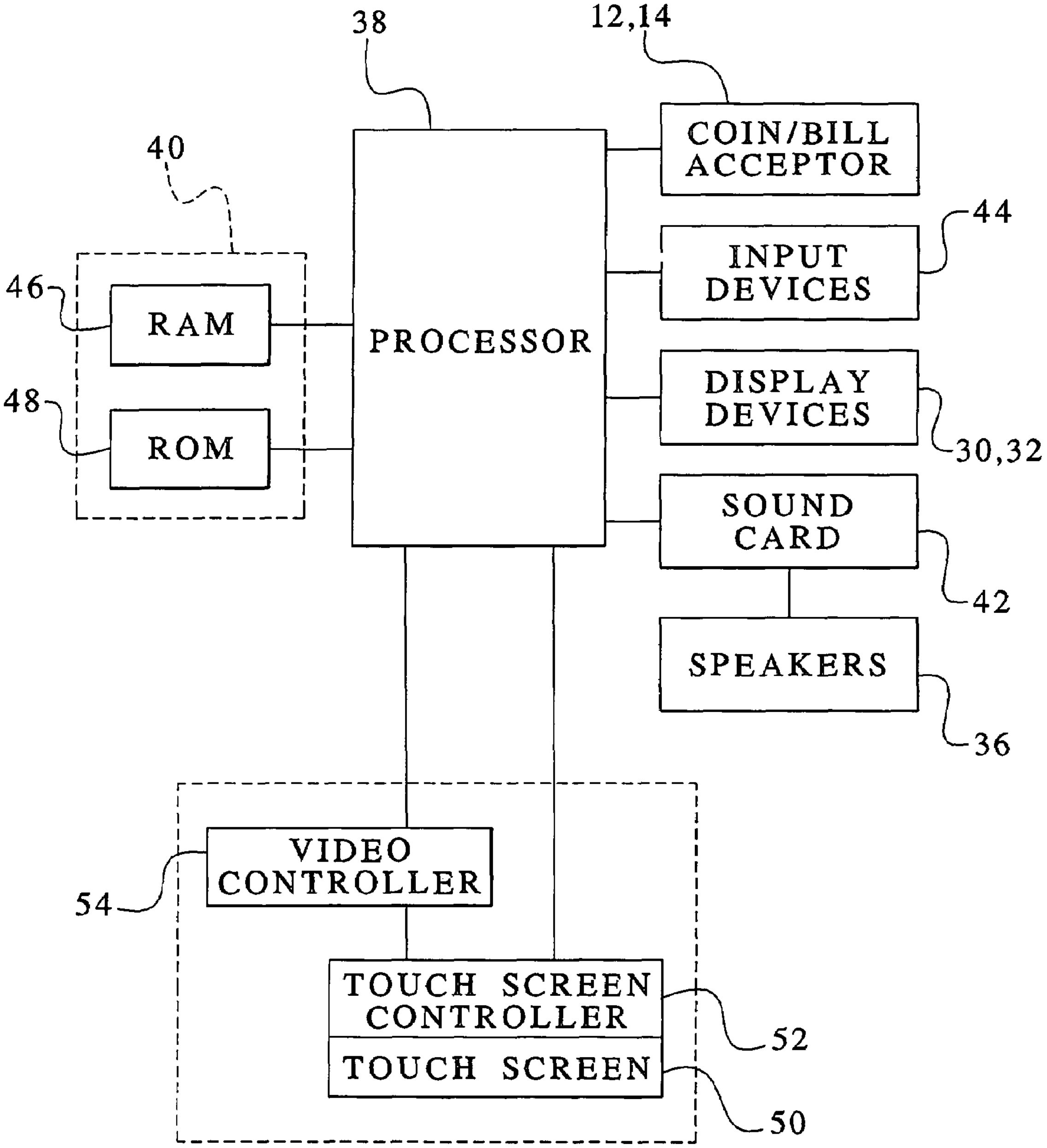
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The processor may include a sub-processor for performing certain game functions. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be for instance a particular arrangement of indicia on a display device. The gaming device 10 preferably uses a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

If a player achieves a bonus triggering or qualifying condition while playing the game, the gaming device 10 automatically initiates the bonus round of the present invention. The bonus scheme of the present invention includes: a plurality of inputs; a plurality of value sets associated with the outcomes of the inputs or input outcomes; and one or more values included within each value set. The player can make inputs and cause the gaming device to store or otherwise designate, and preferably indicate, values until the player reaches a terminating condition. Preferably, the input is a player choosing one or more selections from a plurality of selections. A terminating condition can occur when the player makes an input which causes a predetermined outcome to occur, when the player makes a predetermined number of inputs, when the gaming device stores, designates or indicates all of the values in a value set or when any other predetermined event or sequence of events occurs. The gaming device provides the player with some, and preferably with all of the stored, designated or indicated values when the bonus round terminates.

A value set can include any number of values. Preferably the values in each value set vary in magnitude. It is also preferable that the various value sets in a bonus round include the same quantity of values.

Figure 3:
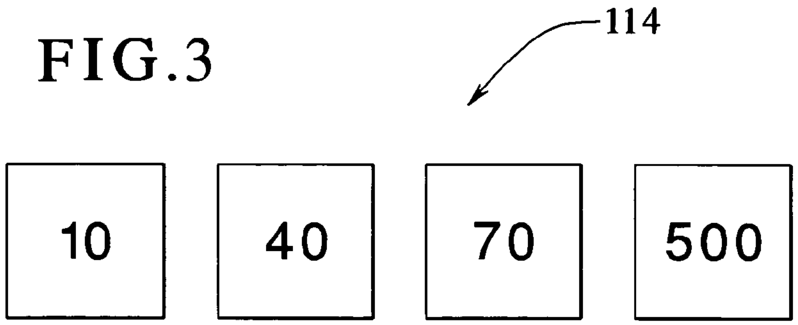
FIG. 3 is an example of a value order in one embodiment of the present invention.

The values included in each value set are arranged in a predetermined value order. The value order is preferably related to the visual arrangement of the values in a value set. For example, a value set 114 could include values ten, forty, seventy and five hundred arranged in a horizontal fashion, as illustrated in FIG. 3. The value order could be sequential from left to right, sequential from right to left or any logical, illogical or random manner in which the gaming device indicates values. The value order can also be non-incremental, resulting in the indication of more than one value at once. If the value order were sequential from left to right, the gaming device may indicate values as follows: first, ten; second, forty; third, seventy; and fourth, five hundred.

Figure 4:
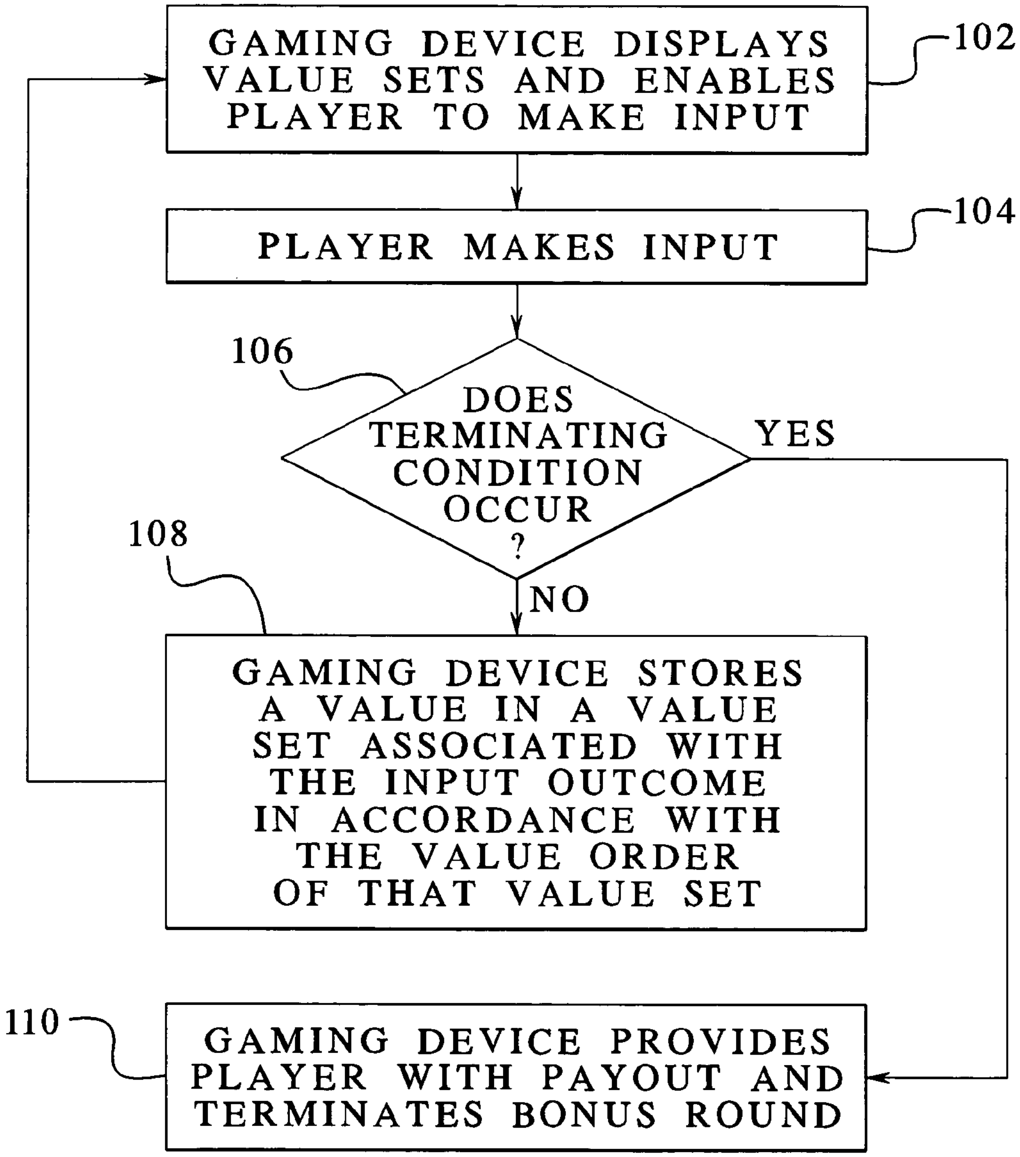
FIG. 4 is a flow diagram of one embodiment of the present invention.

Referring to FIG. 4, in operation of one embodiment, the gaming device initially displays a plurality of value sets and enables a player to make one or more inputs as indicated by block 102. The player then makes an input as indicated by block 104. As indicated by diamond 106 and block 108 if a terminating condition does not occur, the gaming device stores in memory, designates and preferably indicates, a value in a value set associated with the input outcome, and the gaming device does so in accordance with the value order of that value set. This entire process repeats itself until the player reaches a terminating condition as indicated by diamond 106. Once a terminating condition occurs, the gaming device provides the player with the payout corresponding to some, and preferably all, of the stored, designated or indicated values, and the gaming device then terminates the bonus round as indicated by block 110.

In one embodiment of the present invention illustrated in FIGS. 5A through 5G, the input is the player choosing one or more selections from a plurality of selections 112*a* through 112*p*. The gaming device displays the plurality of selections and two value sets 114*a* and 114*b* to the player. The selections are illustrated as boxes, however, they can be graphical representations of any person, place or thing. The quantity of selections 112*a* through 112*p* exceeds the quantity of values 116*a* through 116*j* included in both of the value sets 114*a* and 114*b*. The value sets 114*a* and 114*b* include a vertical visual arrangement of values. The value order for both value sets 114*a* and 114*b* begins with the bottom value 116*e* or 116*j*, respectively, and moves upward, sequentially in a ladder-like fashion until reaching the top values 116*a* or 116*f*, respectively. This value order is illustrated in FIGS. 5A through 5G with the arrows leading from one value to another. Although the values for each value set may differ with no particular order, the magnitude of values within each value set preferably increases in accordance with the value order.

In the example bonus round shown in FIGS. 5A through 5G, value set 114*a* incorporates a star theme, and value set 114*b* incorporates a diamond theme. The themes are incorporated into the value sets graphically, as illustrated by the star symbol 118 and the diamond symbol 120 located above value set 114*a* and value set 114*b*, respectively. Here, each value set includes five values. The gaming device enables the player to choose selections 112*a* through 112*p*, individually by touching a touch screen, activating a play button or using any other suitable activator or selector. When a player chooses a selection, the gaming device reveals a symbol at the location of the chosen selection. The input outcome in this embodiment is the symbol. A symbol can be any audio and/or visual representation of a person, place or thing. Each symbol corresponds to or is associated with one of the value sets, preferably in an audio and/or visual manner. In this example, the star symbol 118 corresponds to the star-themed value set 114*a*, and the diamond symbol 120 corresponds to the diamond-themed value set 114*b*. It should be appreciated that more than two value sets could be employed.

This example includes three types of symbols: the star symbol 118, the diamond symbol 120 and a game limit symbol 122. When a player reaches a game limit symbol, the gaming device may immediately terminate the bonus round or terminate the bonus round after the player makes a predetermined number of additional choices or inputs, such as two or three additional inputs. In this embodiment, if the player reaches a game limit symbol 122, the gaming device terminates the bonus round after the player makes one additional choice of a selection. Here, game limit symbol 122 is illustrated by the following encircled text: "ONE MORE CHOICE."

Figure 5A:
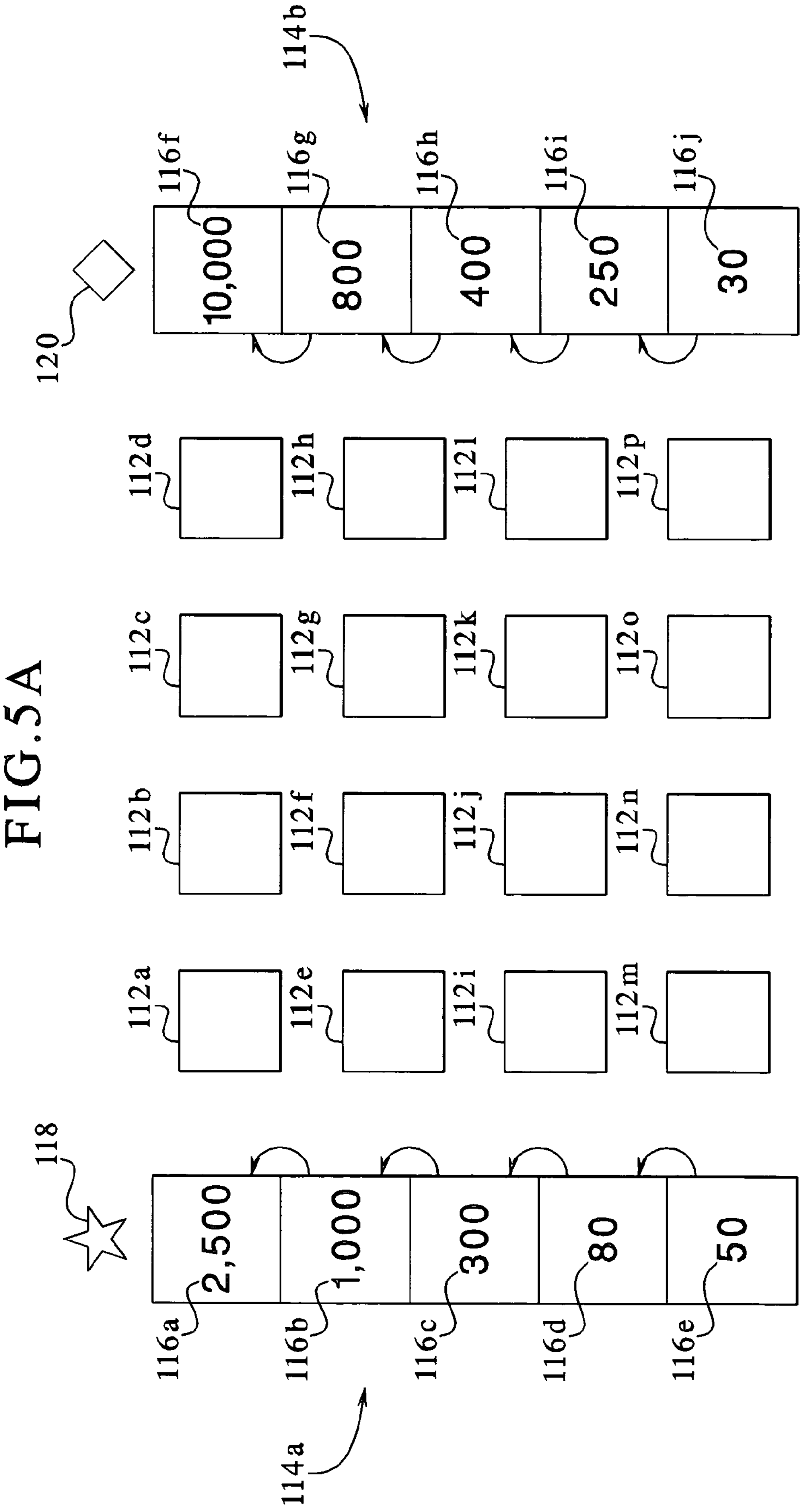
FIGS. 5A, 5B, 5C, 5D, 5E, 5F and 5G are top plan views of the displays of an example bonus round of one embodiment of the present invention.
Figure 5B:
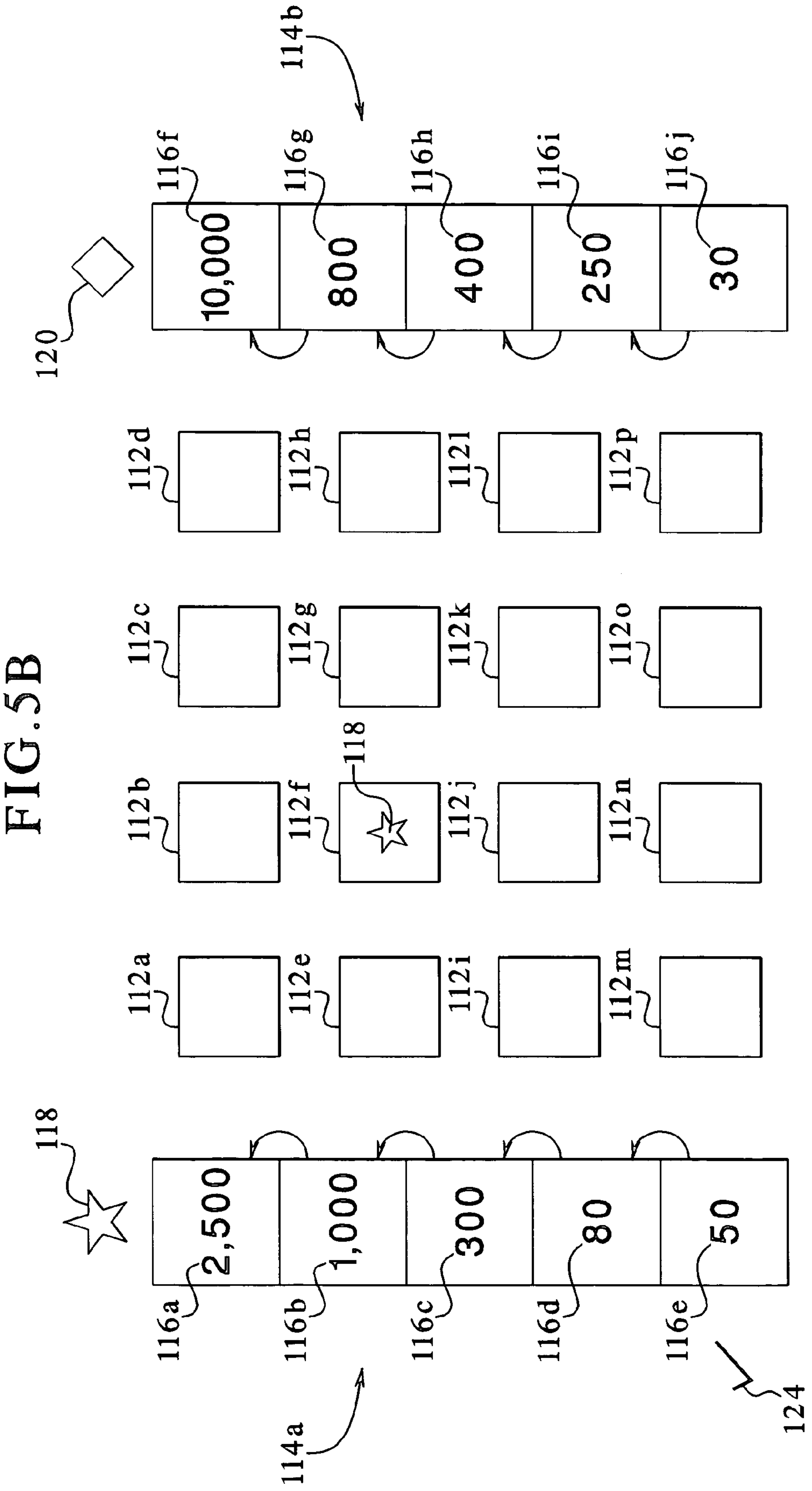

With reference to FIG. 5A, the gaming device initially displays the selections 112*a* through 112*p* and value sets 114*a* and 114*b* to the player. The player then chooses selection 112*f* as shown in FIG. 5B. The gaming device then unmasks or reveals star symbol 118 at the location of selection 112*f*. Next, the gaming device indicates value 116*e* with an indicator 124 which is illustrated as a checkmark located adjacent to the value 116*e*. It should be appreciated that indicators 124 can include any audio and/or visual technique or manner of indicating values 116 or otherwise informing a player as to what values the gaming device has designated for the player.

Figure 5C:
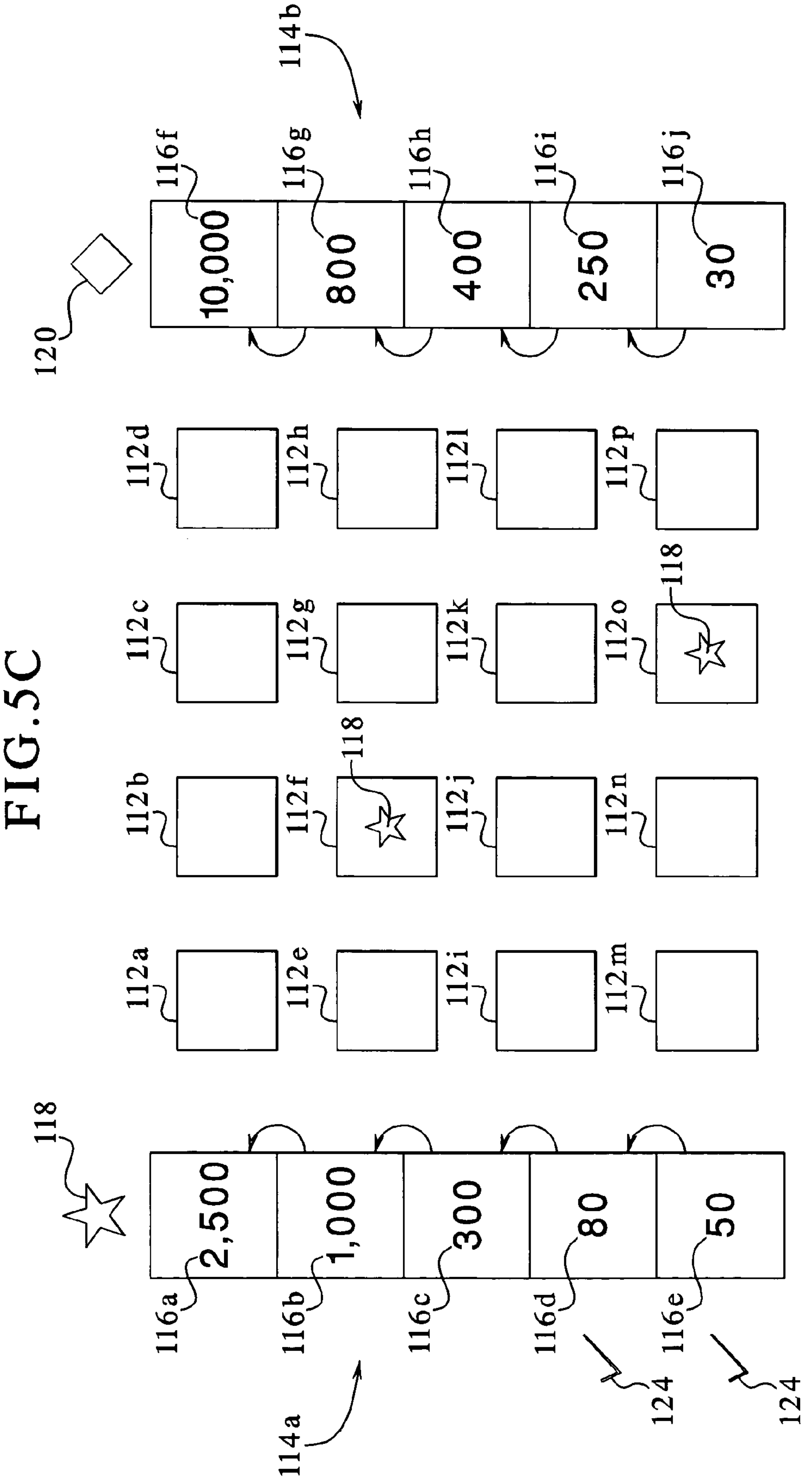
Figure 5D:
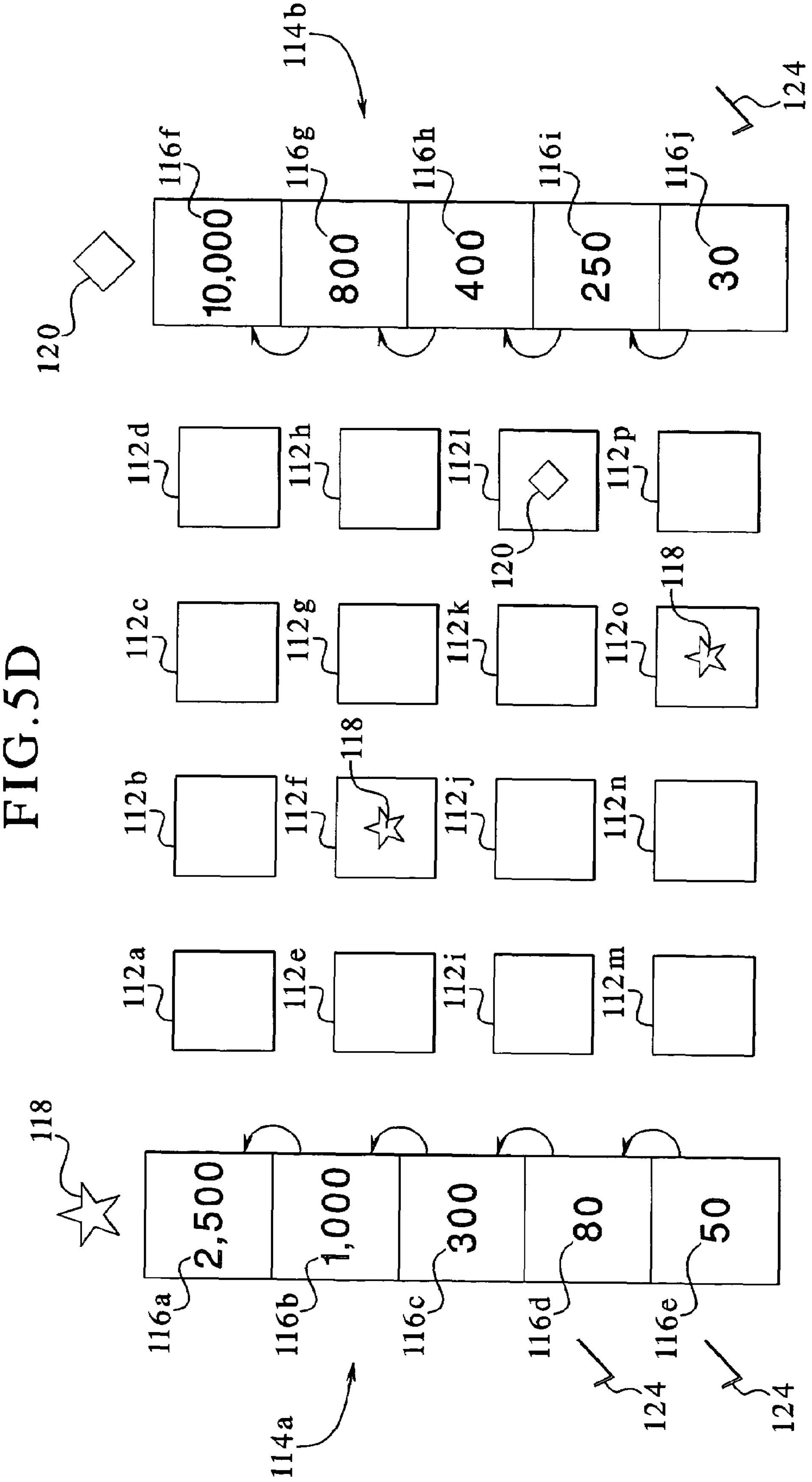
Figure 5E:
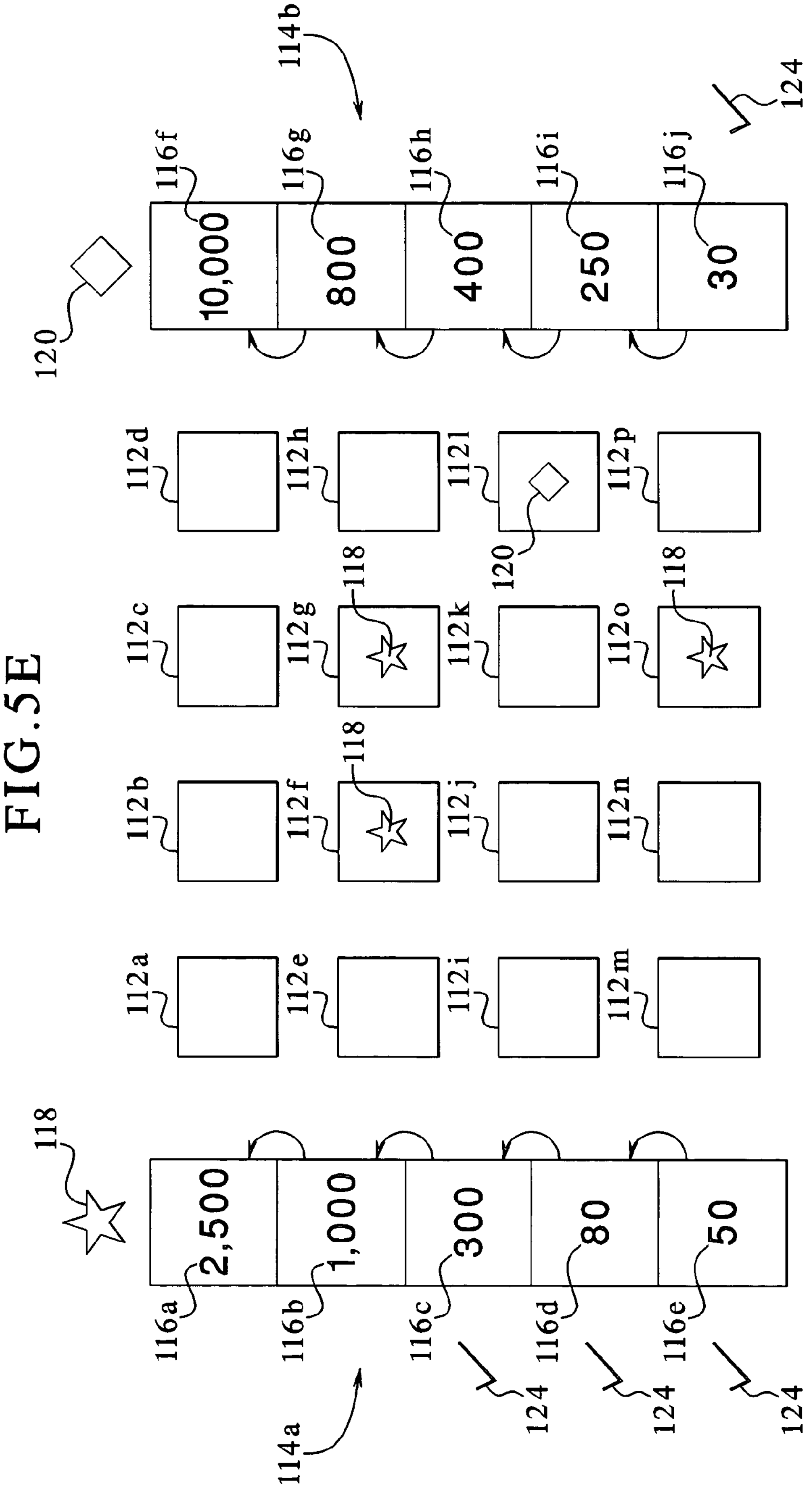
Figure 5F:
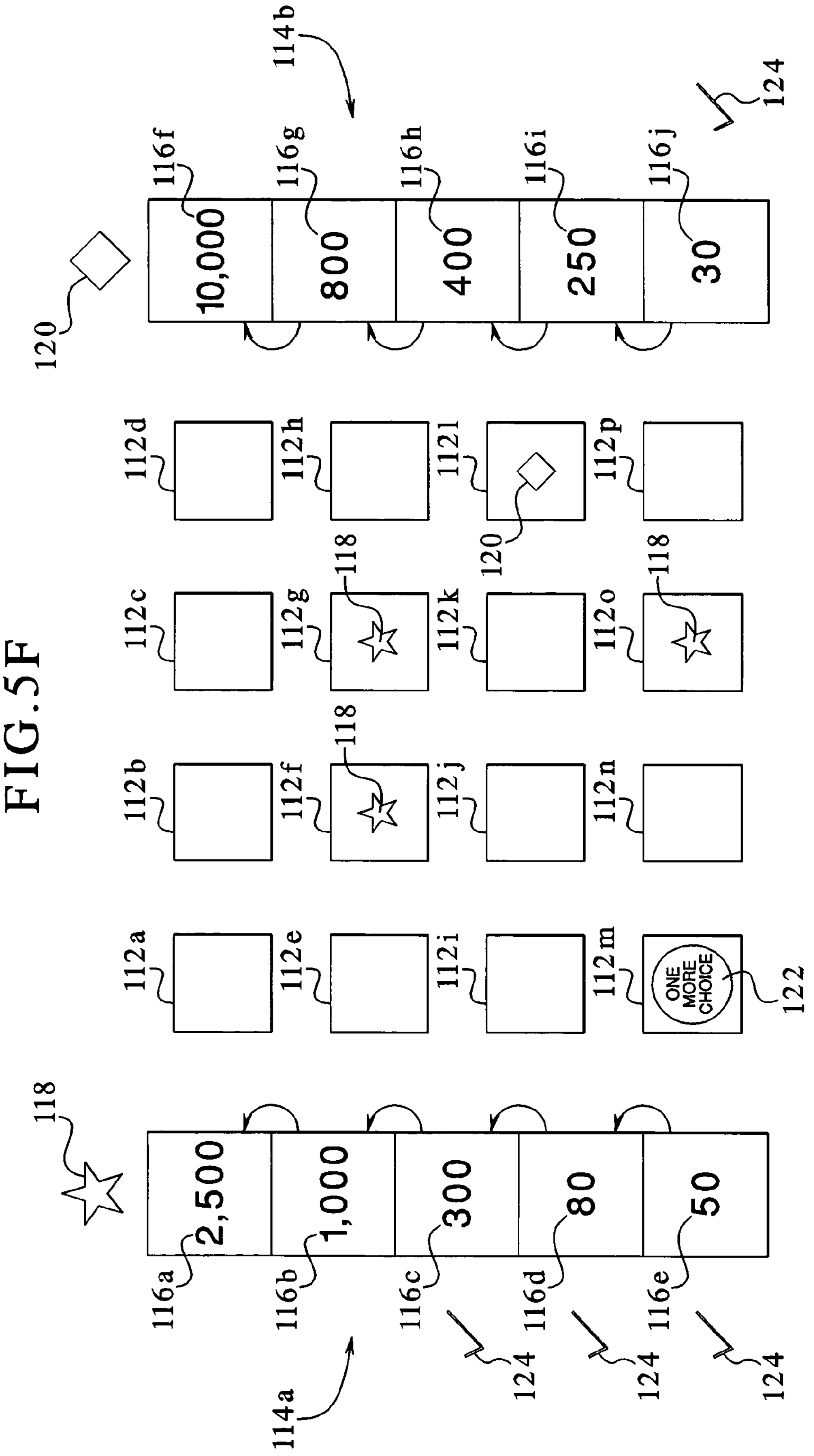
Figure 5G:
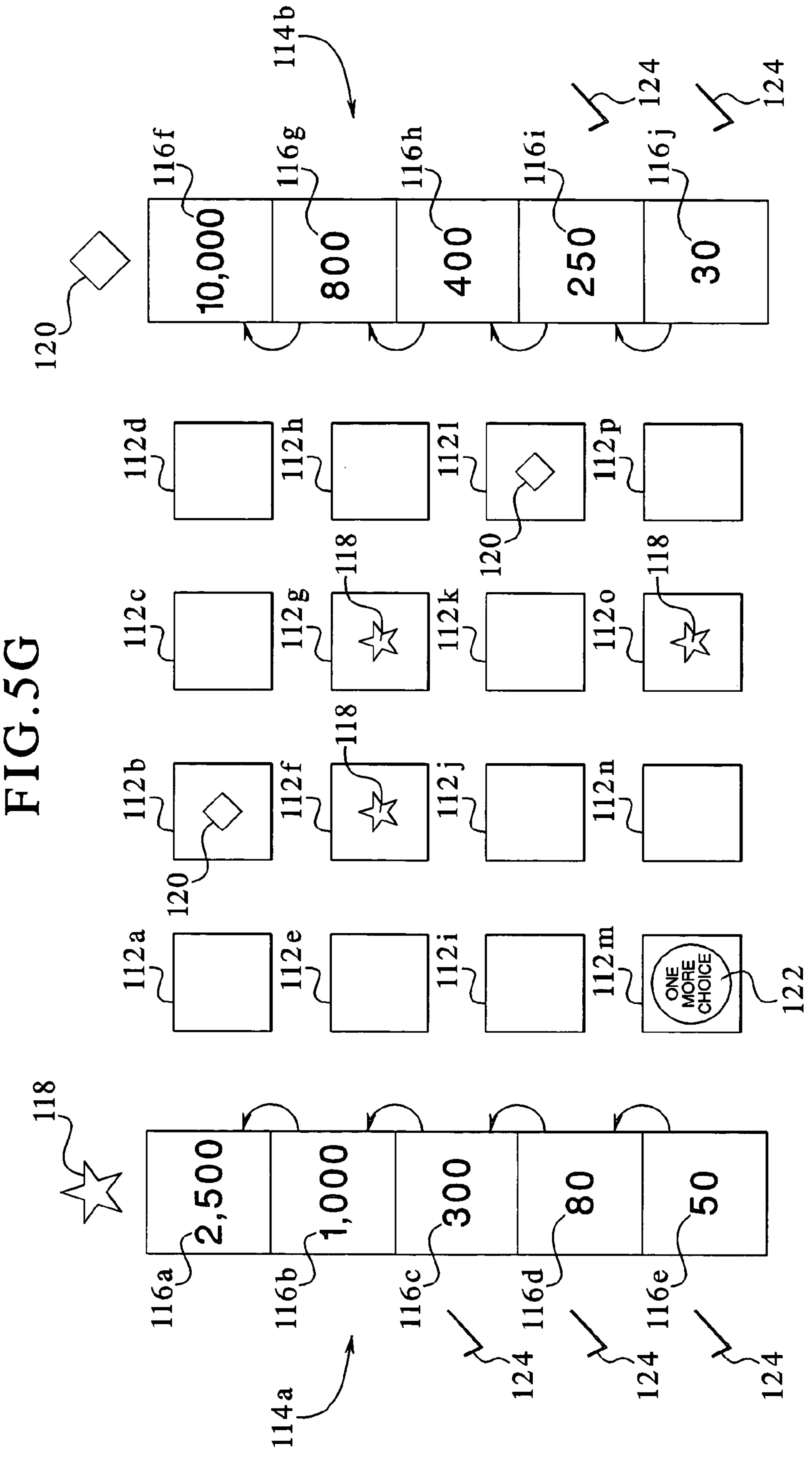

The player then chooses another selection 112*o*, as shown in FIG. 5C. Again, the player reaches a star symbol 118. Accordingly the gaming device indicates value 116*d*. As shown in FIG. 5D, upon the player's next choice, which is selection 112*l*, the player reaches a diamond symbol 120. The gaming device then indicates value 116*j*. Continuing, the player chooses selection 112*g*, as shown in FIG. 5E. Here, the player reaches another star symbol 118, and the gaming device indicates value 116*c*. The player then chooses selection 112*m* as shown in FIG. 5F. Here, the gaming device unmasks or reveals game limit symbol 122 which causes the bonus round to terminate after the player chooses one more selection 112. The player's final choice is selection 112*b*, as shown in FIG. 5G. With this choice, the player reaches diamond symbol 120, and the gaming device indicates value 116*i* appropriately. At this point, the gaming device awards the player with the sum of the indicated values 116*c*, 116*d*, 116*e*, 116*j* and 116*i*, which is seven hundred ten (i.e., 300+80+50+250+30). The bonus round then terminates.

In other embodiments illustrated in FIGS. 6A through 6E, the gaming device processor applies a predetermined mathematical formula to the designated values before providing the player with a final bonus award. The gaming device initially displays the selections 112*a* through 112*p* and value sets 114*a* and 114*b* to the player. Value set 114*a* has a star theme indicated by star symbol 118, and all star symbols are associated with value set 114*a*. Likewise, value set 114*b* has a diamond theme indicated by diamond symbol 120, and all diamond symbols are associated with value set 114*b*.

Value set 114*a* includes values 126*a* to 126*e*, and value set 114*b* includes values 126*f* to 126*j*. Display window 128 displays the running total of all values designated in value set 114*a*, and display window 130 displays the running total of all values designated in value set 114*b*. In this example, the player chose a total of five selections, specifically selections 112*b*, 112*f*, 112*g*, 112*o* and 112*m*.

When the player chose selection 112*b*, an outcome occurred which caused the processor to designate values 126*j* and 126*i* in the diamond value set 114*b*. This outcome is a multi-value outcome which causes the processor to move two steps up value set 114_b_ and designate values 126_j_ and 126_i_. This outcome is indicated by diamond symbol 120_a_ which states "2 UP." The designation of values is illustrated in this example by bolding the borders of the values. Display window 130 for value set 114_b_ displays two hundred eighty credits, the sum of designated values two hundred fifty and thirty.

When the player chose selections 112_f_, 112_g_ and 112_o_, following each choice the processor designated a value 126_e_, 126_d_ and 126_c_, respectively. This outcome causes the processor to move one step up value set 114_a_ with each choice of each selection 112_f_, 112_g_ and 112_o_. This outcome is designated by star symbol 118_a_ which states "1 UP." Display window 128 for value set 114_a_ displays five hundred sixty credits, the sum of designated values four hundred, one hundred and sixty.

When the player chose selection 112_m_, a termination outcome occurred which is indicated by terminator symbol 132. The termination outcome terminated the bonus round and also caused the processor to apply a mathematical formula involving the designated values in the value sets 114_a_ and 114_b_. The result from applying this formula is displayed in display windows 134_a_ to 134_d_ which states "FINAL BONUS AWARD."

Figure 6A:
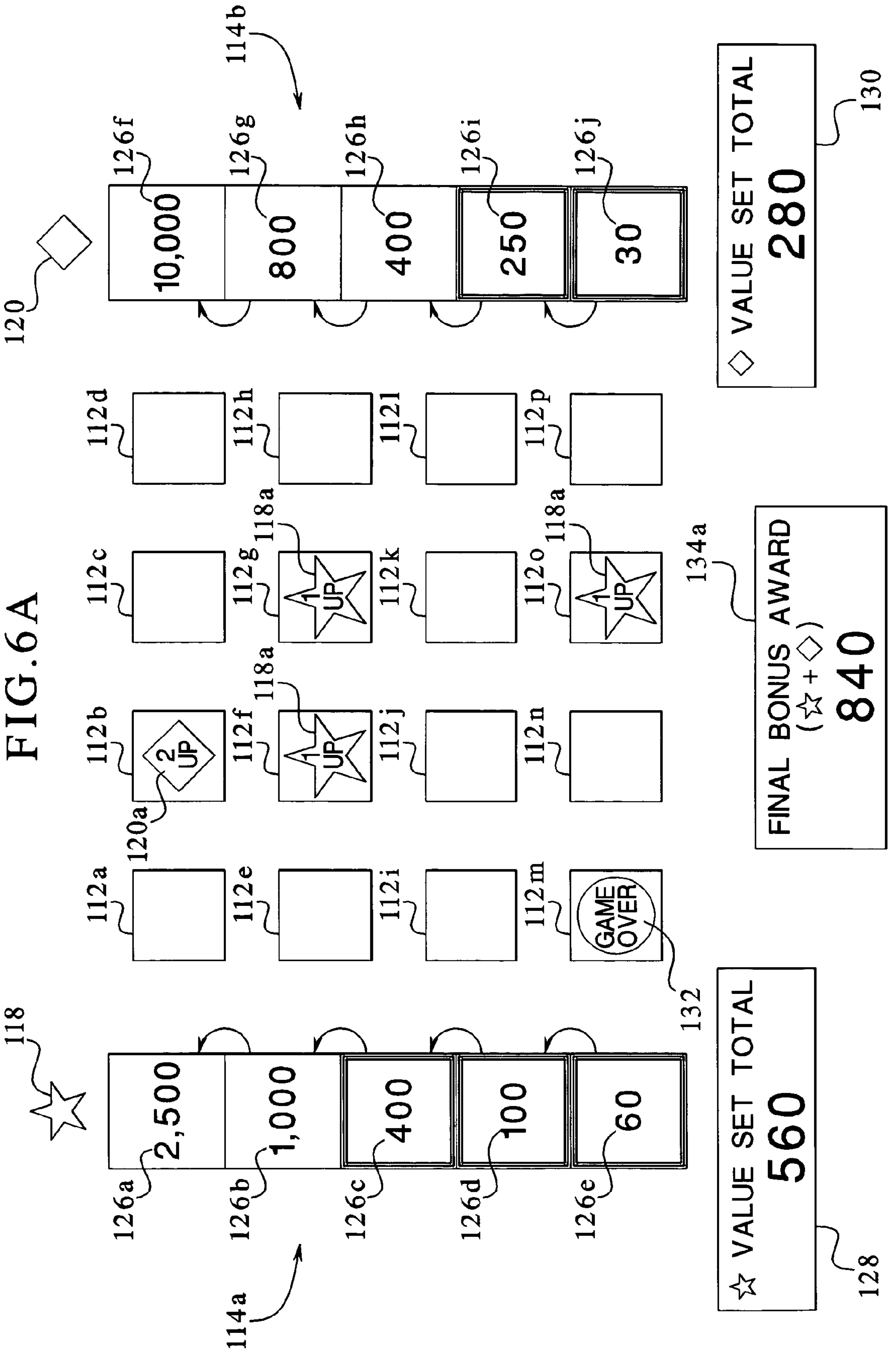
FIGS. 6A, 6B, 6C, 6D and 6E are top plan views of the displays of example bonus rounds in various embodiments of the present invention.
Figure 6B:
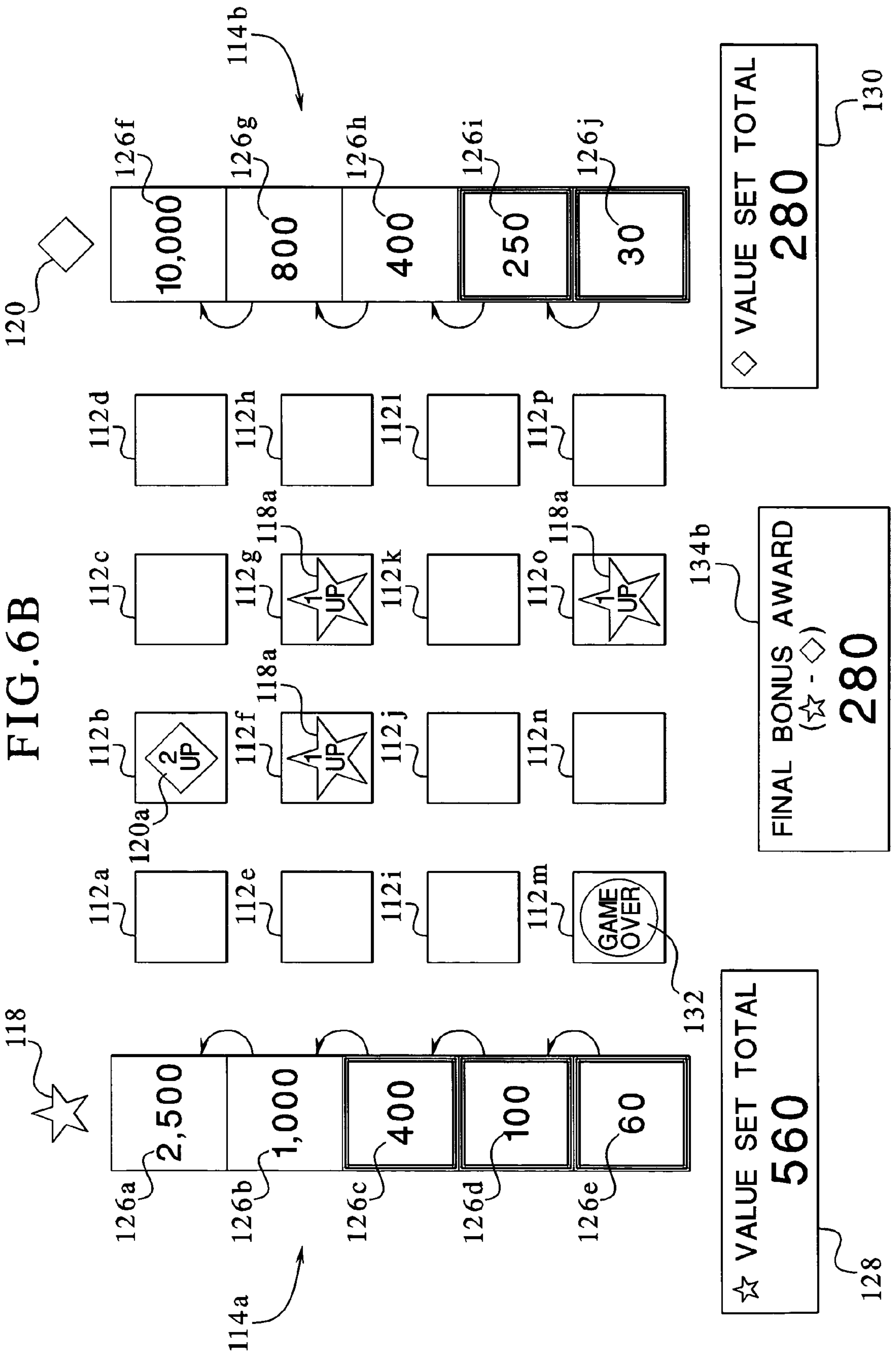
Figure 6C:
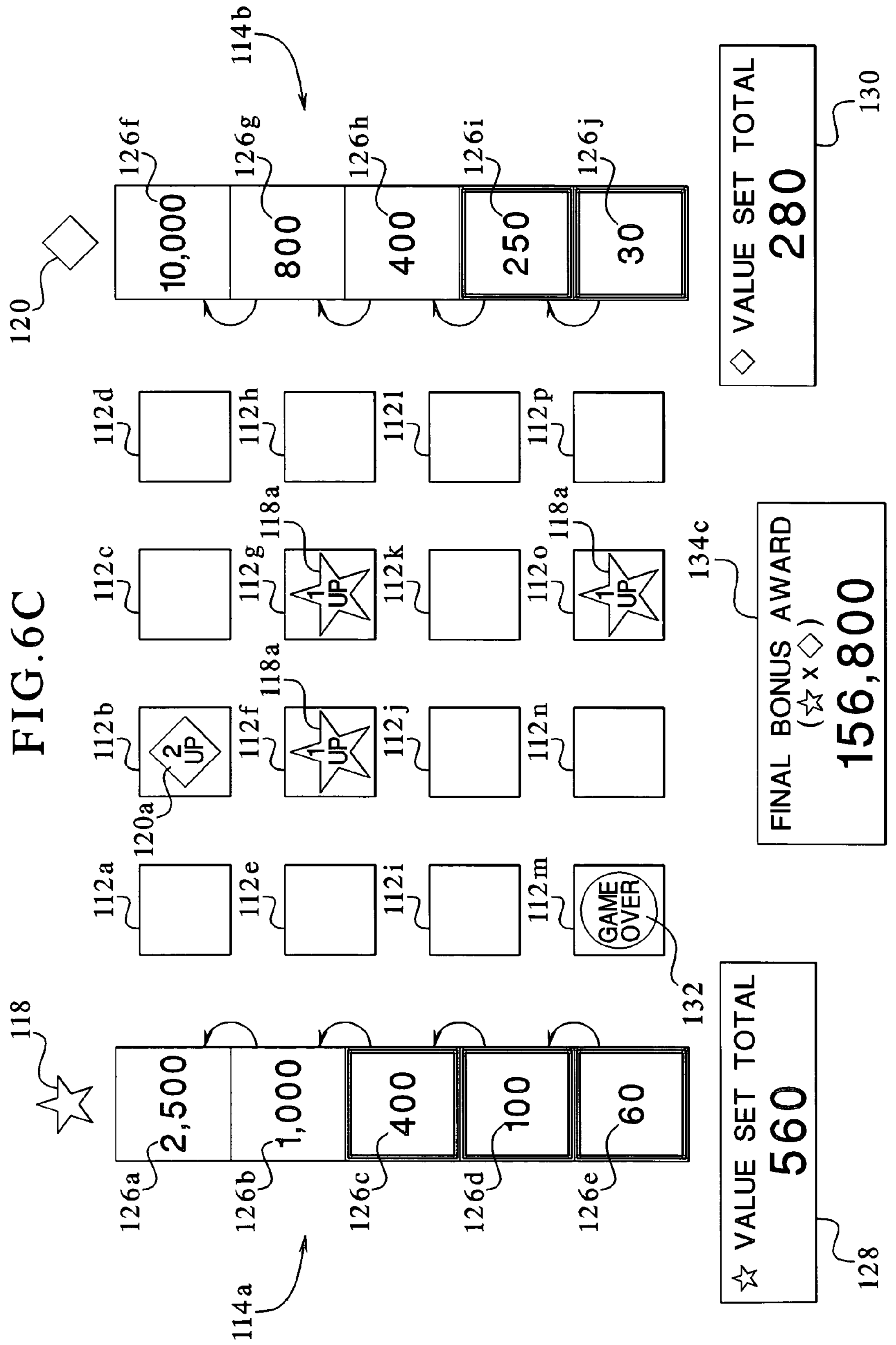
Figure 6D:
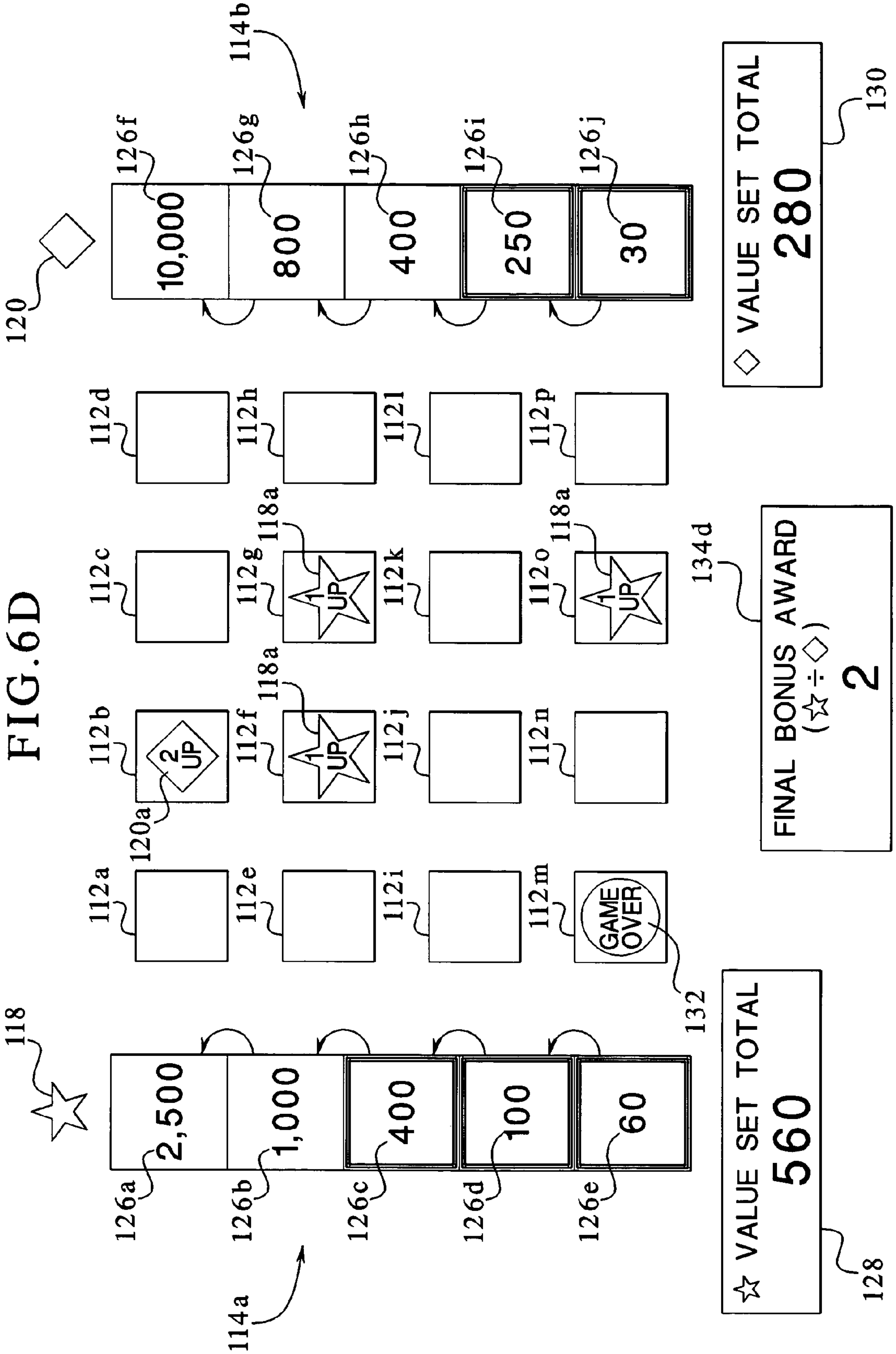
Figure 6E:
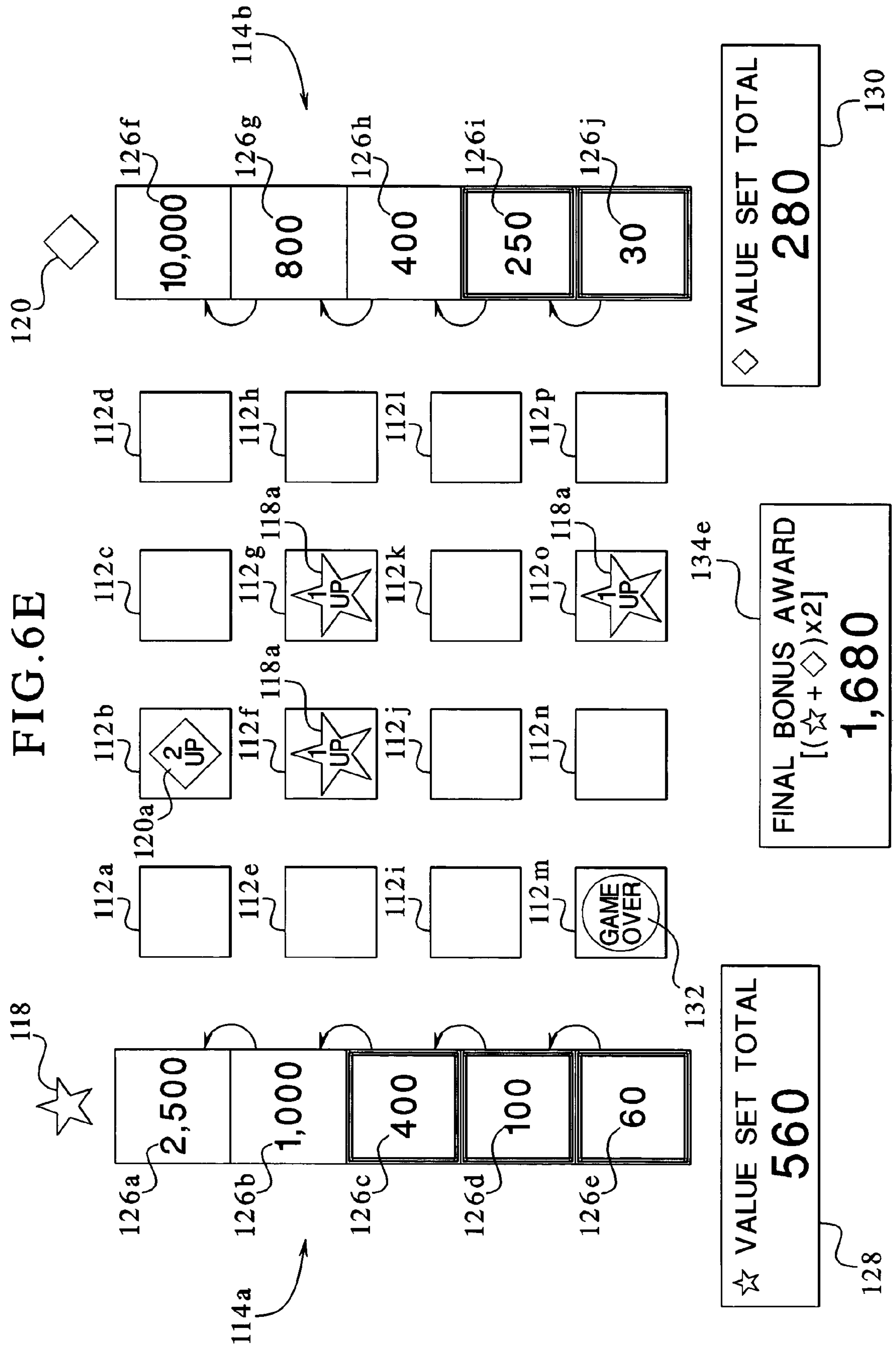

The mathematical formula for different embodiments is parenthetically illustrated in display windows 134_a_ to 134_d_. As illustrated in FIG. 6A, the formula can include the addition of value set total 128 and value set total 130. The formula can also include the subtraction of value set total 130 from value set total 128, as illustrated in FIG. 6B. Also, the formula can include the multiplication of value set total 128 by value set total 130, as illustrated in FIG. 6C. Furthermore, the formula can include the division of value set total 128 by value set total 130, as illustrated in FIG. 6D. As illustrated in FIG. 6E, the formula can include any predetermined mathematical manipulation or change to value set total 128 and value set total 130. After the processor applies any of such formulas, the gaming device awards the player with the resulting value.

The bonus scheme of the present invention enables players to make inputs and receive certain values associated with the outcomes of certain inputs. By including the values within value sets and indicating values in a predetermined order, the gaming device enables players to monitor their award growth and to aim for values in particular value sets. This type of bonus scheme increases the excitement and enjoyment experienced by gaming device players.

In one alternative embodiment, if a player chooses a predetermined selection or if a predetermined event occurs, or at the end of the game, the gaming device can award the player with the highest designated value, the lowest designated value, the average of the designated values, the last designated value, a predetermined designated value in the order, or a randomly determined designated value in the order, included within one or more of the value sets. For instance, when the player makes a final selection before the bonus round terminates, the gaming device could award the player with the highest value within the value set which is associated with that final selection.

In another alternative embodiment, the gaming device could enable the player to designate a desired value set as a preferred or distinct value set. The gaming device could then associate a predetermined factor with the distinct value set. Preferably the factor increases the award level of the distinct value set. For example, the factor may increase the awards within that value set by two times.

In a further alternative embodiment, a predetermined or randomly determined mathematical formula is associated with a terminator or terminating selection. When the selection having the terminator is picked, the mathematical formula associated with the terminator or terminating selection is employed to determine the award based on the designated values in one or more of the value sets as described above. In a further alternative embodiment, a plurality of predetermined or randomly determined mathematical formulas are associated with a plurality of terminators or terminating selections. When one of the selections having a terminator is picked, the mathematical formula associated with that terminator or terminating selection is employed to determine the award based on the designated values in one or more of the value sets as described above.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

a plurality of value sets;

a plurality of values in each of said value sets;

a value order associated with each value set, wherein the value order defines a first value and a last value in each value set;

at least one outcome associated with each value set;

at least one termination event;

a display device; and a processor operable with said display device to:

(a) display the value sets;

(b) cause an input to be made;

(c) generate one of said outcomes or said termination event based on said input;

(d) if one of said outcomes is generated, designate a next value in the value order of the value set associated with said generated outcome;

(e) repeat steps (b) to (d) until said termination event is generated;

(f) determine an award by applying a mathematical formula to said designated values; and (g) provide a player with the determined award.

2. The gaming device of claim 1, wherein at least two of the same value sets are associated with at least one generated outcome, and the processor is operable to designate at least two of the next values in said value order of said value sets when said outcome is generated.

3. The gaming device of claim 1, wherein at least two different value sets are associated with at least one generated outcome, and the processor is operable to designate a next value in each value order of each said value set when said outcome is generated.

4. The gaming device of claim 1, wherein the mathematical formula is selected from the group consisting of: a sum of at least one of the designated values in said plurality of value sets, a sum of the designated values in one value set and the designated values in another value set, a subtraction of the designated values in one value set from the designated values in another value set, a multiplication of the designated values in one value set by the designated values in another value set, and a division of the designated values in one value set by the designated values in another value set.

5. The gaming device of claim 1, wherein the display device includes an indicator which indicates the value orders of the value sets to the player.

6. The gaming device of claim 1, wherein the display device is adapted to display said mathematical formula.

7. The gaming device of claim 1, wherein said termination event is generated when a predetermined number of values are designated.

8. The gaming device of claim 1, wherein the termination event is generated when all of the values in one of the value sets are designated.

9. The gaming device of claim 1, wherein said mathematical formula is associated with the generated termination event.

10. The gaming device of claim 1, which includes a plurality of termination events wherein a mathematical formula is associated with each termination event and said mathematical formula used by the processor is the mathematical formula associated with the generated termination event.

11. The gaming device of claim 1, wherein at least one of said termination events is associated with at least one player input, wherein if said termination event is generated, the player is enabled to make at least one additional input before said award is determined.

12. The gaming device of claim 1, wherein the processor is operable to enable the player to select one of said value sets and modify said plurality of values in said selected value set.

13. The gaming device of claim 1, wherein said values in at least one of said value sets are in a non-incremental value order.

14. The gaming device of claim 1, wherein said values in at least one of the value orders are designated in an incremental order.

15. The gaming device of claim 1, wherein said values in at least one of said value sets are in a randomly determined value order.

16. The gaming device of claim 1, wherein said values in each of the value orders are designated in an incremental order.

17. The gaming device of claim 1, wherein the processor applies said mathematical formula to said designated values selected from the group consisting of: the highest designated value, the lowest designated value, the average of the designated values, the last designated value, a predetermined designated value, and a randomly determined designated value, in the value orders included within the value sets.

18. The gaming device of claim 1, wherein the processor is operable to enable the player to make said input.

19. A gaming device controlled by a processor, said gaming device comprising:

a primary game operable upon a wager by a player;

a plurality of value sets;

a plurality of values in each of said value sets;

a value order associated with each value set, wherein the value order defines a first value and a last value in each value set;

at least one outcome associated with each value set;

at least one termination event; and a triggering event associated with said primary game, wherein after the occurrence of said triggering event:

(a) the value sets are displayed;

(b) an input is caused to be made;

(c) one of said outcomes or said termination event is generated based on said input;

(d) if one of said outcomes is generated, a next value in the value order of the value set associated with said generated outcome is designated;

(e) steps (b) to (d) are repeated until said termination event is generated;

(f) an award is determined by applying a mathematical formula to said designated values; and (g) the player is provided with the determined award.

20. The gaming device of claim 19, wherein at least two of the same value sets are associated with at least one generated outcome, and at least two of the next values in said value order of said value set are designated when said outcome is generated.

21. The gaming device of claim 19, wherein at least two different value sets are associated with at least one generated outcome, and a next value in each value order of each said value set is designated when said outcome is generated.

22. The gaming device of claim 19, wherein the value sets are indicated to the player.

23. The gaming device of claim 19, wherein said mathematical formula is displayed to the player.

24. The gaming device of claim 19, wherein the player is enabled to make said input.

25. A gaming device controlled by a processor, said gaming device comprising:

a primary game operable upon a wager by a player;

a plurality of value sets;

a plurality of values in each value set;

a value order associated with each value set, the value order defining a first value and a last value in each value set;

a plurality of selectable symbols;

at least one outcome associated with each value set; and a triggering event associated with said primary game, wherein after the occurrence of said triggering event (a) said value sets are displayed to the player; (b) a plurality of said selectable symbols are selected; (c) an outcome based on each selected symbol is generated; (d) a next value in the value order of the value set associated with each said generated outcome is designated; (e) a mathematical formula is applied to the designated values to determine an award; and (f) the player is provided with the award after a termination event occurs.

26. The gaming device of claim 25, wherein the player is enabled to select a plurality of said selectable symbols.

27. The gaming device of claim 25, wherein at least two of the same value sets are associated with at least one of the selectable symbols, and at least two of the next values in said value order of said value set are designated when said outcome is generated.

28. The gaming device of claim 25, wherein at least two different value sets are associated with at least one of the selectable symbols, and a next value in each value order of each said value set is designated when said outcome is generated.

29. The gaming device of claim 25, wherein the value orders of the value sets are indicated to the player.

30. The gaming device of claim 25, wherein one of said selectable symbols may be selected more than once.

31. A gaming device comprising:

a plurality of value sets;

a plurality of values in each of said value sets;

a value order associated with each value set, wherein the value order defines a first value and a last value in each value set;
at least one outcome associated with each value set;
at least one termination event;
a display device; and
a processor operable with said display device to:
(a) display the value sets;
(b) cause an input to be made;
(c) generate one of said outcomes or said termination event based on said input;
(d) if one of said outcomes is generated, designate a next value in the value order of the value set associated with said generated outcome;
(e) repeat steps (b) to (d) until said termination event is generated;
(f) determine an award based on said designated values; and
(g) provide a player with the determined award.

32. The gaming device of claim 31, wherein the processor is operable to enable the player to make said input.

33. A gaming device comprising:
a plurality of value sets;
a plurality of values in each of said value sets, wherein said values in each of said value sets are arranged in a predetermined order;
a plurality of outcomes, wherein each of said outcomes is associated with one of said value sets;
at least one termination event;
a plurality of selections, wherein each of said selections is associated with one of said outcomes or one of said termination events;
a display device; and
a processor operable with said display device to:
(a) display said plurality of value sets;
(b) cause one of said selections to be picked;
(c) reveal said outcome or said termination event associated with said picked selection;
(d) if said outcome is revealed, indicate a next ordered value of the value set associated with said revealed outcome;
(e) repeat steps (b) to (d) until said termination event is revealed;
(f) determine an award by applying a mathematical formula to said indicated values; and
(g) provide a player said determined award.

34. The gaming device of claim 33, wherein the processor is operable to enable the player to pick one of said selections.

35. A gaming device controlled by a processor, said gaming device comprising:
a primary game operable upon a wager by a player;
a plurality of value sets;
a plurality of values in each of said value sets, wherein said values in each of said value sets are arranged in a predetermined order;
a plurality of outcomes, wherein each of said outcomes is associated with one of said value sets;
at least one termination event;
a plurality of selections, wherein each of said selections is associated with one of said outcomes or one of said termination events; and
a triggering event associated with said primary game, wherein after the occurrence of said triggering event:
(a) said plurality of value sets are displayed;
(b) one of said selections is picked;
(c) said outcome or said termination event associated with said picked selection is revealed;
(d) if said outcome is revealed, a next ordered value of the value set associated with said revealed outcome is indicated;
(e) steps (b) to (d) are repeated until said termination event is revealed;
(f) an award is determined by applying a mathematical formula to said indicated values; and
(g) the player is provided said determined award.

36. The gaming device of claim 35, wherein the player is enabled to pick one of said selections.

37. A gaming device comprising:
a plurality of value sets;
a plurality of values in each of said value sets;
a value order associated with each value set, wherein the value order defines a first value and a last value in each value set;
at least one outcome associated with each value set, wherein at least one of said outcomes is a multiple value outcome;
at least one termination event;
a display device; and
a processor operable with said display device to:
(a) display the value sets;
(b) cause an input to be made;
(c) generate one of said outcomes or said termination event based on said input;
(d) if one of said outcomes is generated, indicate a next value in the value order of the value set associated with said generated outcome, wherein if said multiple value outcome is generated, indicate at least two of the next values in the value order of the value set associated with said generated multiple value outcome;
(e) repeat steps (b) to (d) until said termination event is generated;
(f) determine an award by applying a mathematical formula to said indicated values; and
(g) provide a player with the determined award.

38. The gaming device of claim 37, wherein the processor is operable to enable the player to make said input.

39. A gaming device controlled by a processor, said gaming device comprising:
a primary game operable upon a wager by a player;
a plurality of value sets;
a plurality of values in each of said value sets;
a value order associated with each value set, wherein the value order defines a first value and a last value in each value set;
at least one outcome associated with each value set, wherein at least one of said outcomes is a multiple value outcome;
at least one termination event; and
a triggering event associated with said primary game, wherein after the occurrence of said triggering event:
(a) the value sets are displayed;
(b) an input is made;
(c) one of said outcomes or said termination event is generated based on said input;
(d) if one of said outcomes is generated, a next value in the value order of the value set associated with said generated outcome is indicated, wherein if said multiple value outcome is generated, at least two of the next values in the value order of the value set associated with said generated multiple value outcome are indicated;
(e) steps (b) to (d) are repeated until said termination event is generated;

(f) an award is determined by applying a mathematical formula to said indicated values; and (g) the player is provided with the determined award.

40. The gaming device of claim 39, wherein the player is enabled to make said input.

41. A gaming device comprising:

a plurality of value sets;

a plurality of values in each of said value sets;

a value order associated with each value set, wherein the value order defines a first value and a last value in each value set;

at least one outcome associated with each value set;

a plurality of termination events, wherein each of said termination events is associated with one of a plurality of mathematical formulas;

a display device; and a processor operable with said display device to:

(a) display the value sets;

(b) cause an input to be made;

(c) generate one of said outcomes or said termination event based on said input;

(d) if one of said outcomes is generated, designate a next value in the value order of the value set associated with said generated outcome;

(e) repeat steps (b) to (d) until said termination event is generated;

(f) determine an award by applying the mathematical formula associated with said generated termination event to said designated values; and (g) provide a player with the determined award.

42. The gaming device of claim 41, wherein each of said termination events is randomly associated with one of said mathematical formulas.

43. The gaming device of claim 41, wherein said processor is operable to enable the player to make said input.

44. A gaming device controlled by a processor, said gaming device comprising:

a primary game operable upon a wager by a player;

a plurality of value sets;

a plurality of values in each of said value sets;

a value order associated with each value set, wherein the value order defines a first value and a last value in each value set;

at least one outcome associated with each value set;

a plurality of termination events, wherein each of said termination events is associated with one of a plurality of mathematical formulas; and a triggering event associated with said primary game, wherein after the occurrence of said triggering event:

(a) the value sets are displayed;

(b) an input is made;

(c) one of said outcomes or said termination event is generated based on said input;

(d) if one of said outcomes is generated, a next value in the value order of the value set associated with said generated outcome is indicated;

(e) steps (b) to (d) are repeated until said termination event is generated;

(f) an award is determined by applying the mathematical formula associated with said generated termination event to said indicated values; and (g) the player is provided with the determined award.

45. The gaming device of claim 44, wherein the player is enabled to make said input.

46. A gaming device comprising:

a plurality of outcomes;

a plurality of termination events, wherein each of said termination events is associated with one of a plurality of different mathematical formulas;

a plurality of selections, wherein each of said selections is associated with one of said outcomes or one of said termination events;

a display device; and a processor operable with said display device to:

(a) cause one of said selections to be picked;

(b) reveal said outcome or said termination event associated with said picked selection;

(c) repeat steps (a) to (b) until said termination event is revealed;

(d) determine an award by applying the mathematical formula associated with said revealed termination event; and (e) provide a player said determined award.

47. The gaming device of claim 46, wherein said processor is operable to enable said selections to be picked by the player.

48. A gaming device controlled by a processor, said gaming device comprising:

a primary game operable upon a wager by a player;

a plurality of outcomes;

a plurality of termination events, wherein each of said termination events is associated with one of a plurality of different mathematical formulas;

a plurality of selections, wherein each of said selections is associated with one of said outcomes or one of said termination events;

a triggering event associated with said primary game, wherein after the occurrence of said triggering event:

(a) one of said selections is caused to be picked;

(b) said outcome or said termination event associated with said picked selection is revealed;

(c) steps (a) to (b) are repeated until said termination event is revealed;

(d) an award is determined by applying the mathematical formula associated with said revealed termination event; and (e) the player is provided said determined award.

49. The gaming device of claim 48, wherein the player is enabled to pick one of said selections.

50. A gaming device comprising:

a plurality of values;

a first value set including a plurality of said values;

a second value set including at least one of said values;

at least one outcome associated with each value set;

at least one termination event;

a display device; and a processor operable with said display device to:

(a) display the value sets;

(b) cause an input to be made;

(c) generate one of said outcomes or said termination event based on said input;

(d) if one of said outcomes is generated, designate a value of the value set associated with said generated outcome;

(e) repeat steps (b) to (d) until said termination event is generated;

(f) determine an award by applying a mathematical formula to said designated values; and (g) provide a player with the determined award.

51. The gaming device of claim 50, wherein said processor is operable to enable the player to make said input.

52. A method of operating a gaming device, said method comprising the steps of:

(a) displaying a plurality of values sets, wherein each value set includes a plurality of values, each value set is associated with a value order that defines a first value and a last value and each value set is associated with at least one outcome;
(b) causing an input to be made;
(c) generating one of said outcomes or a termination event based on said input;
(d) if one of said outcomes is generated, designating a next value in the value order of the value set associated with said generated outcome;
(e) repeating steps (b) to (d) until said termination event is generated;
(f) determining an award by applying a mathematical formula to said designated values; and
(g) providing a player with the determined award.

53. The method of claim 52, wherein the player is enabled to make said input.

54. The method of claim 52, wherein said steps are provided to the player through a data network.

55. The method of claim 54, wherein the data network is an internet.

56. A method of operating a gaming device, said method comprising the steps of:
(a) displaying a plurality of selectable symbols;
(b) displaying a plurality of value sets, wherein each value set includes a plurality of values and each value set is associated with a value order that defines a first value and a last value;
(c) selecting a plurality of said selectable symbols;
(d) generating an outcome based on each selected symbol;
(e) designating a next value in the value order of the value set associated with each of said generated outcomes;
(f) applying a mathematical formula to the designated values to determine an award when a termination event occurs; and
(g) providing a player with the determined award.

57. The method of claim 56, wherein the player is enabled to select said plurality of said selectable symbols.

58. The method of claim 56, wherein said steps are provided to the player through a data network.

59. The method of claim 58, wherein the data network is an internet.

60. A method of operating a gaming device, said method comprising the steps of:
(a) displaying a plurality of selections wherein each of said selections is associated with one of a plurality of outcomes or a termination event;
(b) displaying a plurality of value sets, wherein each value set includes a plurality of values that are arranged in a predetermined order;
(c) causing one of said selections to be picked;
(d) revealing said outcome or said termination event associated with said picked selection;
(e) if said outcome is revealed, indicating a next ordered value of the value set associated with said revealed outcome;
(f) repeating steps (c) to (e) until said termination event is revealed;
(g) determining an award by applying a mathematical formula to said indicated values; and
(h) providing a player said determined award.

61. The method of claim 60, wherein the player is enabled to pick one of said selections.

62. The method of claim 60, wherein said steps are provided to the player through a data network.

63. The method of claim 62, wherein the data network is an internet.

64. A method of operating a gaming device, said method comprising the steps of:
(a) displaying a plurality of values sets, wherein each value set includes a plurality of values, each value set is associated with a value order that defines a first value and a last value, each value set is associated with at least one outcome and at least one of said outcomes is a multiple value outcome;
(b) causing an input to be made;
(c) generating one of said outcomes or a termination event based on said input;
(d) if one of said outcomes is generated, indicating a next value in the value order of the value set associated with said generated outcome, wherein if said multiple value outcome is generated, indicating at least two of the next values in the value order of the value set associated with said generated multiple value outcome;
(e) repeating steps (b) to (d) until said termination event is generated;
(f) determining an award by applying a mathematical formula to said indicated values; and
(g) providing a player with the determined award.

65. The method of claim 64, wherein the player is enabled to make said input.

66. The method of claim 64, wherein said steps are provided to the player through a data network.

67. The method of claim 66, wherein the data network is an internet.

68. A method of operating a gaming device, said method comprising the steps of:
(a) displaying a plurality of values sets, wherein each value set includes a plurality of values, each value set is associated with a value order that defines a first value and a last value and each value set is associated with at least one outcome;
(b) causing an input to be made;
(c) generating one of said outcomes or one of a plurality of termination events based on said input, wherein each of said termination events is associated with one of a plurality of mathematical formulas;
(d) if one of said outcomes is generated, indicating a next value in the value order of the value set associated with said generated outcome;
(e) repeating steps (b) to (d) until said termination event is generated;
(f) determining an award by applying the mathematical formula associated with said generated termination event to said indicated values; and
(g) providing a player with the determined award.

69. The method of claim 68, wherein the player is enabled to make said input.

70. The method of claim 68, wherein said steps are provided to the player through a data network.

71. The method of claim 70, wherein the data network is an internet.

72. A method of operating a gaming device, said method comprising the steps of:
(a) causing one of a plurality of selections to be picked, wherein each of said selections is associated with one of a plurality of outcomes or one of a plurality of termination events, wherein each of said termination events is associated with one of a plurality of different mathematical formulas;
(b) revealing said outcome or said termination event associated with said picked selection;

(c) repeating steps (a) to (b) until said termination event is revealed;

(d) determining an award by applying the mathematical formula associated with said revealed termination event; and (e) providing a player said determined award.

73. The method of claim 72, wherein said selections are picked by the player.

74. The method of claim 72, wherein said steps are provided to the player through a data network.

75. The method of claim 74, wherein the data network is an internet.

76. A method of operating a gaming device, said method comprising the steps of:

(a) displaying a first value set and a second value set, wherein said first value set includes a plurality of values, said second value set includes at least one value and each value set is associated with at least one outcome;

(b) causing an input to be made (c) generating one of said outcomes or a termination event based on said input;

(d) if one of said outcomes is generated, designating a value of the value set associated with said generated outcome;

(e) repeating steps (b) to (d) until said termination event is generated;

(f) determining an award by applying a mathematical formula to said designated values; and (g) providing a player with the determined award.

77. The method of claim 76, wherein the player is enabled to make said input.

78. The method of claim 76, wherein said steps are provided to the player through a data network.

79. The method of claim 78, wherein the data network is an internet.

80. The gaming device of claim 46, wherein the plurality of different mathematical formulas are predetermined.

81. The gaming device of claim 46, wherein the plurality of different mathematical formulas are randomly determined.

82. The gaming device of claim 48, wherein the plurality of different mathematical formulas are predetermined.

83. The gaming device of claim 48, wherein the plurality of different mathematical formulas are randomly determined.

84. The method of claim 72, wherein the plurality of different mathematical formulas are predetermined.

85. The method of claim 72, wherein the plurality of different mathematical formulas are randomly determined.

* * * * *

UNITED STATES PATENT AND TRADEMARK OFFICE

CERTIFICATE OF CORRECTION

PATENT NO. : 7,338,364 B2 
APPLICATION NO. : 10/767378
DATED : March 4, 2008
INVENTOR(S) : Anthony J. Baerlocher et al.

It is certified that error appears in the above-identified patent and that said Letters Patent is hereby corrected as shown below:

TITLE PG, ITEM (56)

In References Cited, “5,947,592 A 9/1990 Barlow” to --5,947,820 A 9/1990 Barlow--.

In Claim 64, Column 18, Line 5 change “values” to --value--.

In Claim 68, Column 18, Line 33 change “values” to --value--.

Signed and Sealed this

Twenty-third Day of September, 2008

JON W. DUDAS
*Director of the United States Patent and Trademark Office*